Patented Aug. 16, 1932

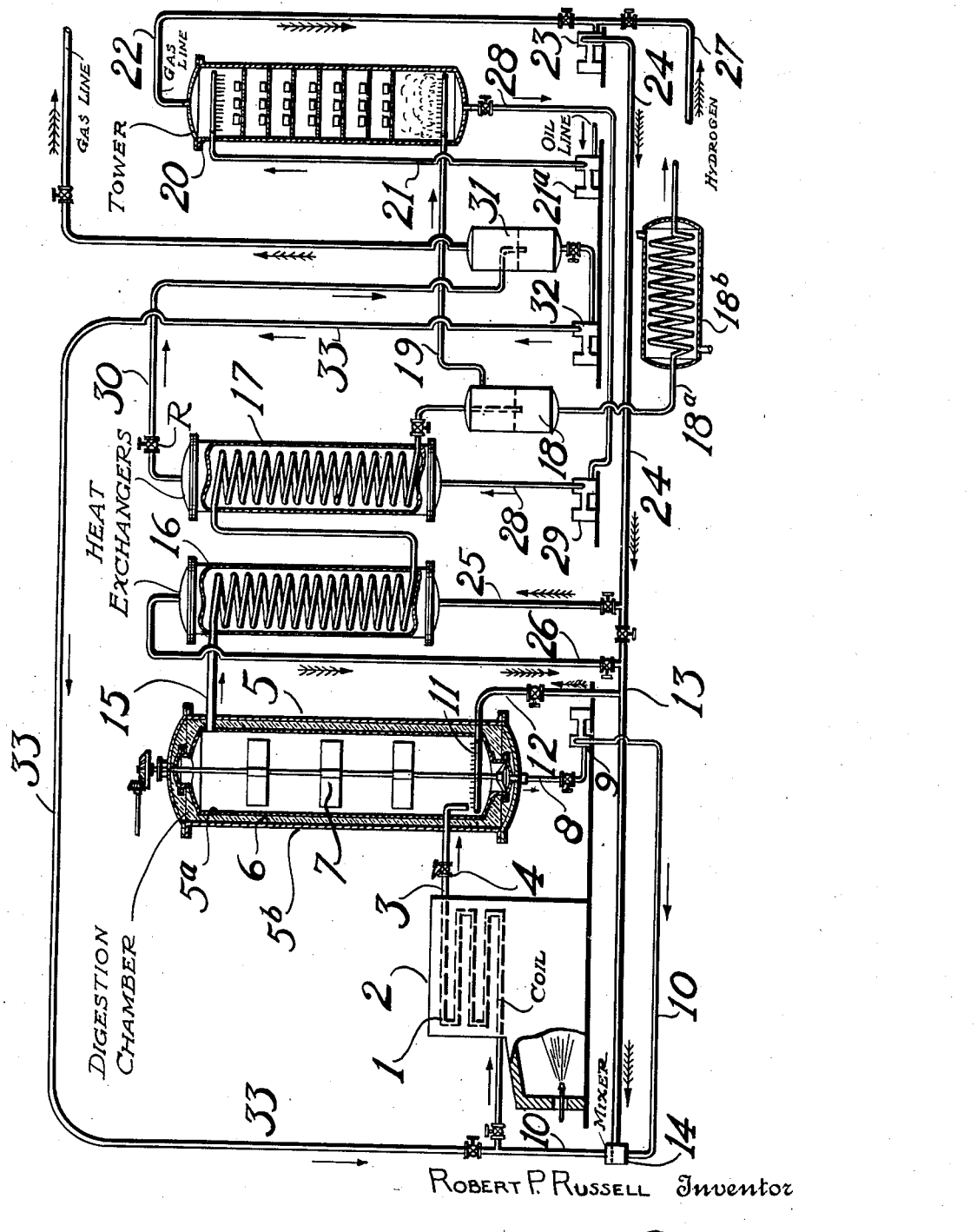

1,872,011

UNITED STATES PATENT OFFICE

ROBERT P. RUSSELL, OF BATON ROUGE, LOUISIANA, ASSIGNOR TO STANDARD-I. G. COMPANY

IMPROVED PROCESS FOR TREATING HYDROCARBONS

Application filed July 2, 1928. Serial No. 289,705.

The present invention relates to the art of obtaining valuable low boiling distillates from carbonaceous material and more specifically comprises an improved method for decomposing carbonaceous materials in the presence of hydrogen. My invention will be understood from the following description and the drawing which illustrates one form of apparatus suitable for use with my method.

The drawing is a semi-diagrammatic view in sectional elevation of an apparatus constructed according to my invention and showing the flow of materials.

Referring to the drawing, reference numeral 1 denotes a pipe coil arranged in a furnace setting 2. The material heated by passage through coil 1 is discharged through line 3, which may be fitted with a check valve 4, into a digestion chamber 5. The digestion chamber may be of any preferred design but it should be adapted to withstand pressure in excess of 200 atmospheres and it is protected against loss of heat. It is advantageous to construct the drum with a relatively thin inner wall 5a, and insulating layer 6 and a relatively heavy wall 5b to withstand the pressure. The contents of the digestion chamber is kept in thorough agitation by a stirring means 7 or by any other suitable means, and temperature is maintained between preferable limits of 750 and 970° F. either by internal heaters (not shown) or, as I prefer, by circulating a part of the oil from drum 5 through line 8, pump 9 and line 10, back to coil 1 and drum 5.

Hydrogen, or a gas containing a substantial quantity of hydrogen, is sprayed into drum 5 by spray pipe 11 which is fed from a supply line 13 and a further quantity of such gas may be added to the oil returning to coil 1. The gas is preferably added in a finely divided state by passing through a porous plate or by passage with the oil through any convenient type of mixer, shown generally at 14.

Vapor from drum 5 is conducted by pipe 15 to a pair of heat exchangers 16 and 17 arranged in series for the passage of the vapor. Readily liquefied products are condensed and the mixture of condensate and gas is discharged into a separator 18 from which liquid is withdrawn to storage (not shown) by line 18a and through cooler 18b. Vapor passes by line 19 to a scrubbing tower 20 which is fed at the top with fresh oil to be fed to coil 1 and drum 5, as will be described. The oil is fed by line 21 and pump 21a, and in passing the tower 20, dissolves a substantial quantity of hydrocarbon gas and impurities such as hydrogen sulfid. Gas leaves tower 20 by line 22 and may be further purified, if desired, for example by scrubbing with an alkaline solution, and is recompressed by compressor or booster 23 and conducted by line 24 to line 13. A part of the gas is circulated through exchanger 16 for preheating by lines 25 and 26 before entering line 13, as will be understood. Make up hydrogen is added by pipe 27.

The fresh oil charged with dissolved gas is passed by line 28 and pump 29 to heat exchanger 17 and from thence by line 30 which may be fitted with a reduction valve R to a preliminary still or separator 31. The dissolved gases are removed and conducted to storage (not shown) for use as fuel or otherwise, while the liquid is pumped by pump 32 through line 33 to coil 1.

In the operation of my process, oils such as crude or reduced crude, or any cut therefrom heavier than gasoline, may be treated alone or may be admixed with tars and pitches or solid bitumens or powdered coil. Decomposition takes place under the action of high pressure of hydrogen to yield substantial quantities of low boiling hydrocarbon oils. The fluid mass is heated by passage through coil 1 to a decomposing temperature, preferably between 750 and 970° F. and I prefer to provide hydrogen in contact with the oil during such heating. Catalysts may also be present suspended in the oil, such as finely ground iron oxid or molybdenum oxid or chromium oxid or a mixture of any of these materials. The heated mass is discharged into the drum 5 which is maintained at a temperature of between 750 and 970° F., preferably by recirculation of oil, has been described. Hydrogen is also circulated through the oil. It will be understood that hydrogen is consumed in the reaction which takes place and that a large excess over that which actually enters into combination is circulated through the apparatus. Pressure during the heating and digestion stages is in excess of 50 atmospheres and preferably from 100 to 200 atmospheres although higher pressures may be used.

Normally liquid hydrocarbons are condensed from the vapors and removed to storage, while uncondensed gases are scrubbed with fresh oil under high pressure, and preferably at temperatures under 100° F. so that a portion of the hydrocarbons present in the gas mixture is dissolved in the oil. It is not necessary to dissolve the entire hydrocarbon content of the gas but it is desired to prevent the recirculated gas from building up to over about 35% hydrocarbon and preferable to maintain the percentage of hydrogen above 50%. Pressure prevailing in absorption tower 20 is in excess of 50 atmospheres and is preferably 100 or 200 atmospheres, substantially equal to the full pressure of the retort 5.

The hydrocarbon gas dissolved together with hydrogen sulfid is removed from the oil by preferably heating alone or by heating together with a reduction of pressure. Although only a simple separator is shown, a stripping column with bell cap plates or the equivalent may be substituted.

My invention is not to be limited to the specific form of apparatus used to illustrate my process but may be used in connection with any continuous form of apparatus for simultaneous decomposition and hydrogenation of carbonaceous materials. My invention is not to be limited by any theory of the process nor by any specific example given merely by way of illustration but only by the following claims in which I wish to claim all novelty inherent in the invention.

I claim:

1. In a process for the destructive hydrogenation of hydrocarbon oils in which the oil is treated in a reaction zone with a gas rich in free hydrogen under pressure in excess of 50 atmospheres and at temperature of the order of 750 to 970° F., the improved steps of separating the reaction gas from the liquid product, scrubbing the gas with the feed oil under pressure and at temperature below about 100° F. whereby a large portion of the hydrocarbon constituents of the gas are dissolved and a gas richer in hydrogen is obtained, heating and reducing pressure on the feed oil whereby the dissolved gas rich in hydrocarbons is expelled and discarded, and then forcing the oil and the undissolved gas rich in hydrogen into the reaction zone.

2. Process according to claim 1 in which the destructive hydrogenation is carried out at a pressure of the order of 200 atmospheres, the feed oil is heated by indirect contact with the hot products from the reaction zone and the gas-scrubbing step is accomplished under substantially the same pressure as prevails in the reaction chamber.

ROBERT P. RUSSELL.